(12) United States Patent
Fishwick

(10) Patent No.: US 9,396,640 B2
(45) Date of Patent: Jul. 19, 2016

(54) RFID ACTIVE CHILD TRACKER

(71) Applicant: OpenTV, Inc., San Francisco, CA (US)

(72) Inventor: Nicholas C. Fishwick, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 103 days.

(21) Appl. No.: 14/472,273

(22) Filed: Aug. 28, 2014

(65) Prior Publication Data

US 2016/0063836 A1    Mar. 3, 2016

(51) Int. Cl.
| | |
|---|---|
| *G08B 5/22* | (2006.01) |
| *G08B 21/02* | (2006.01) |
| *G01S 3/02* | (2006.01) |
| *H04W 64/00* | (2009.01) |
| *G01S 13/06* | (2006.01) |

(52) U.S. Cl.
CPC .............. *G08B 21/0269* (2013.01); *G01S 3/02* (2013.01); *G01S 13/06* (2013.01); *H04W 64/00* (2013.01); *H04W 64/006* (2013.01)

(58) Field of Classification Search
CPC ........ G01S 13/06; G01S 13/75; G01S 13/878
See application file for complete search history.

(56) References Cited

U.S. PATENT DOCUMENTS

| | | | |
|---|---|---|---|
| 2008/0143482 A1* | 6/2008 | Shoarinejad | G01S 7/003 340/10.1 |
| 2012/0036198 A1* | 2/2012 | Marzencki | H04L 61/6081 709/206 |
| 2013/0249736 A1* | 9/2013 | Nikitin | G01S 5/02 342/450 |

\* cited by examiner

*Primary Examiner* — Omeed Alizada
(74) *Attorney, Agent, or Firm* — Schwegman Lundberg & Woessner, P.A.

(57) ABSTRACT

In example embodiments, a system and method for tracking a child using RFID is provided. A first reader detects a signal from the trackable device. First positional data of the trackable device is determined from the signal. The first positional data indicates a first direction of the trackable device relative to the first reader. Second positional data is received from a second reader. The second positional data indicates a second direction of the trackable device relative to the second reader. A location of the trackable device is calculated using the first positional data and the second positional data. The location is presented on the first reader.

19 Claims, 7 Drawing Sheets

RFID ACTIVE CHILD TRACKER

FIELD

The present disclosure relates generally to data processing, and in a specific example embodiment, to tracking an object using radio-frequency identification (RFID).

BACKGROUND

On occasion a child may wander off. In some environments, global positional systems (GPS) may not be available to track the child. For instance, if the child wanders off inside a building (e.g., shopping mall), the structure of the building may block GPS and even cellular signals.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for tracking an object using radio-frequency identification (RFID). In example embodiments, the object may be a child that has wandered off in an environment where GPS may not be available (e.g., indoors).

In example embodiments, a system and method for tracking a child using RFID is provided. A first reader detects a signal from the trackable device that is worn by the child. First positional data of the trackable device is determined from the signal. The first positional data indicates a first direction of the trackable device (e.g., a first vector) relative to the first reader. Second positional data is received from a second reader. The second positional data indicates a second direction of the trackable device (e.g., a second vector) relative to the second reader. A location of the trackable device is calculated using the first positional data and the second positional data. The location is presented on the first reader.

Figure 1:
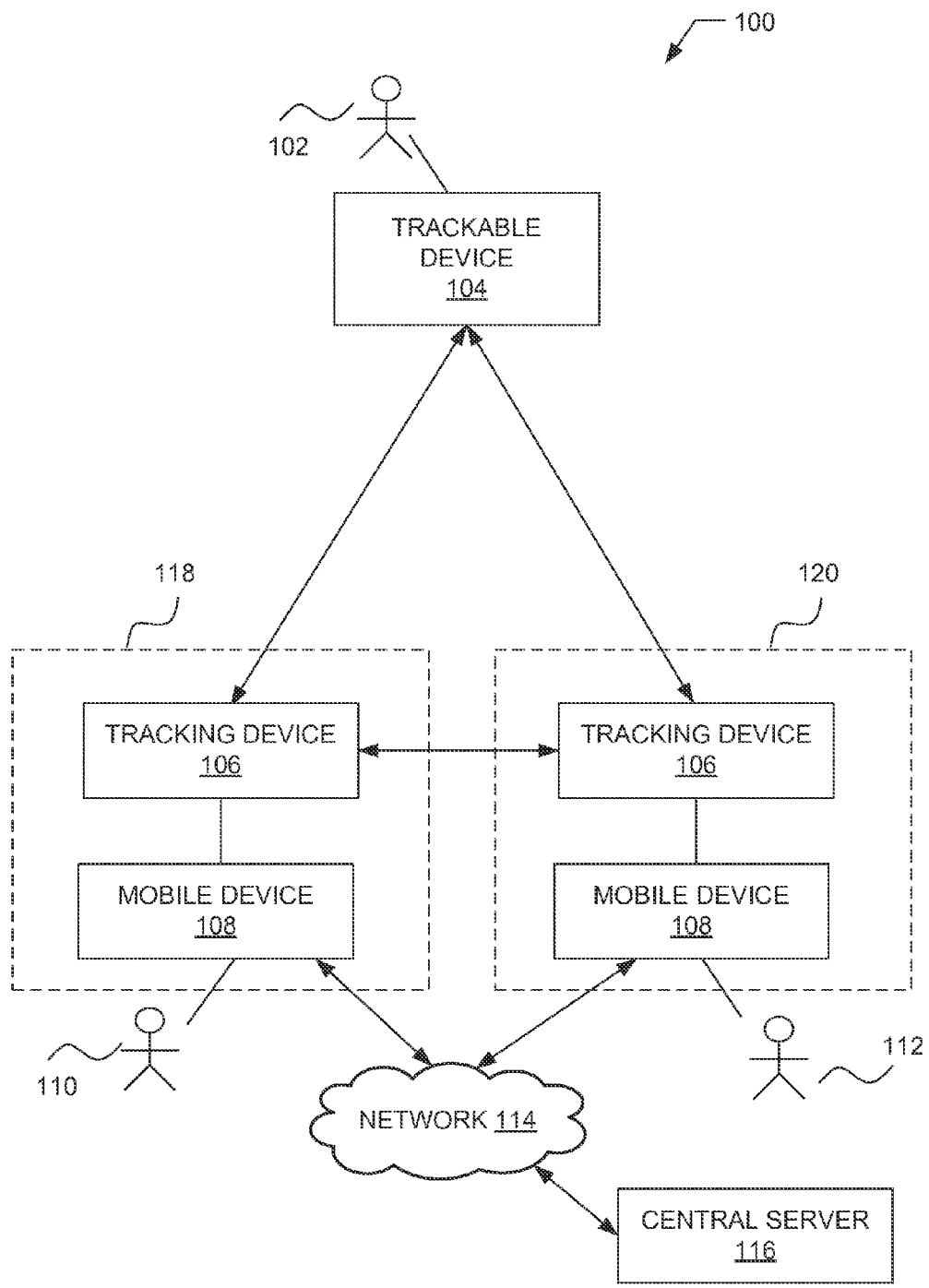
FIG. 1 is a diagram illustrating an environment in which example embodiments of a system for tracking a child using RFID may be implemented.

With reference to FIG. 1, an environment 100 in which example embodiments of a system for tracking a child using RFID may be implemented is shown. The environment 100 comprises a locale where GPS, for example, may not be available. The environment 100 includes a child 102 wearing or carrying a trackable device 104. The trackable device 104 may be, for example, a bracelet, wristband, watch, pin, or any other device that may be attached to the child 102. In example embodiments, the trackable device 104 comprises a semi-passive or active RFID chip or tag (collectively referred to as "RFID tag"). The RFID tag, when active, may emit a signal unique to the RFID tag (herein referred to as a "RFID signal"). As such, the trackable device 104 worn or attached to the child 102 will provide a different signal than a second trackable device worn by another child.

The environment 100 may also comprise at least two tracking devices 106 each coupled to a mobile device 108. The tracking device 106 may be, for example, a mobile device jacket or case that couples to the mobile device 108. Alternatively, the tracking device 106 may be any other type of peripheral device that can couple to the mobile device 108 in order to use the communication and processing capabilities of the mobile device 108. In some embodiments, the tracking device 106 may also comprise an RFID tag that uniquely identifies the tracking device 106. The mobile device 108 may be a smartphone, a tablet computer, a portable media device, a wearable device (e.g., a smart watch or smart glasses), or any other portable device capable of exchanging, processing, and displaying data. The tracking device 106 and the mobile device 108 will be discussed in more detail in connection with FIG. 2 below.

A first set of the tracking device 106 and the mobile device 108 (collectively referred to as a "reader 118") is associated with a first user 110. The first user 110 may be a parent of the child 102. Similarly, a second set of the tracking device 106 and the mobile device 108 (collectively referred to as a "reader 120") is associated with a second user 112. The second user 112 may be another patent of the child 102. Alternatively, the first user 110 or the second user 112 may be a friend or acquaintance of the child 102 or a friend of the parents. The reader may also be referred to as a "RFID reader" in example embodiments.

The mobile devices 108 may exchange data with each other and other mobile devices via a network 114. The network 114 may be any network that enables communication between or among machines, databases, and devices (e.g., the mobile devices 108). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof. Accordingly, the network 104 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMAX network), or any suitable combination thereof. Any one or more portions of the network 104 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, some of the data may be exchanged by way of a central server 116. The central server 116 may maintain a record of which mobile devices 108 are associated with each other (e.g., within a cellular family plan, registered together), or mobile devices 108 that that are linked together (e.g., otherwise indicated in an account or profile of the users). For example, a record may be maintained as part of a user profile or account of the first user 110. Based on a record that links the first user 110 to the second user 112, the central server 116 may, for example, transmit data received from the mobile device 108 of the first user 110 to the mobile device 108 of the second user 112, and vice-versa. Additionally, the record may indicate a corresponding trackable device 104 registered or otherwise linked to the account(s) of the first user 110 or the second user 112. In example embodiments, the record may include an identifier for each of the trackable device 104 (e.g., RFID tag of the trackable device 104), the mobile devices 108 (e.g., a phone number, MAC address), and the tracking devices 106 (e.g., the RFID tag of the tracking devices 106).

The readers 118 and 120 are configured to detect the RFID signal emitted from the trackable device 104 worn by the child 102 (e.g., using the tracking device 106). While the readers 118 and 120 may be able to determine a general direction of the RFID signal, the readers 118 and 120 do not know a distance to the trackable device 104 from a location of each of the readers 118 and 120. As such, the readers 118 and 120 (e.g., via the mobile device 108) may exchange directional data of the RFID signal. The readers 118 and 120 may also exchange or obtain position data of the other reader 118 or 120 in the environment 100 in order to determine (e.g., triangulate) a position of the child 102.

In particular, the child 102 is tagged with a passive or active RFID tag. Using the tracking device 106 in the reader 118 (e.g., a handheld directional RFID reader), the first user 110 scans an area in a sweeping motion to attempt to detect the RFID signal from the trackable device 104. The second user 112 also scans the area to attempt to detect the RFID signal. Accordingly, any number of readers may be used cooperatively and communicate with each other in order to locate the child 102. The first reader 118 detects the RFID signal, which gives the first user 110 a starting position (e.g., where the first user 110 is standing) and a direction in which the RFID signal is coming from.

Additionally, the second user 112 also detects the RFID signal using his reader 120. Because the two users are paired with each other (e.g., linked to each other in an account or profile), the two readers 118 and 120 may share data. Specifically, the first reader 118 of the first user 110 may provide position data (e.g., a location of the first reader 118), positional data of the RFID signal (e.g., a compass bearing of a directional plane of reception), and strength of the reception of the RFID signal (also referred to as a "hit strength") if available. With the shared data from the one or more paired or linked readers, each reader 118 and 120 may calculate and display reception planes/compass bearings, an intersection of the reception planes, and hit strength to identify the location of the child 102. Additionally, if a map exists for the location, the map may be obtained (e.g., pulled from online), and the calculated location may be superimposed on the map. The more readers involved in detecting the RFID signal and sharing their data, the more accurate the location of the child 102. While, two readers 118 and 120 may be an ideal minimum number of readers, the process may still work with reduced accuracy with just one reader.

It is noted that the environment 100 shown in FIG. 1 is merely an example. For example, alternative embodiments may comprise any number of readers in the environment 100. For instance, other users having readers that are not linked to the first user 110 or the second user 112 may cooperate in the search for the child 102 as will be discussed in more detail below. Further still, any number of trackable devices 104 may be associated with the first user 110 and the second user 112. For example, the first user 110 and the second user 112 may be parents that have a plurality of children, each having a designated trackable device 104 that may emit a different RFID signal.

Any of the machines or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 7. Moreover, any two or more of the machines or devices illustrated in FIG. 1 may be combined into a single machine, or the functions described herein for any single machine or device may be subdivided among multiple machines or devices. For example, the reader 118 may be a single device whereby the functionalities of the tracking deice 106 and the mobile device 108 are combined within a single housing.

Figure 2:
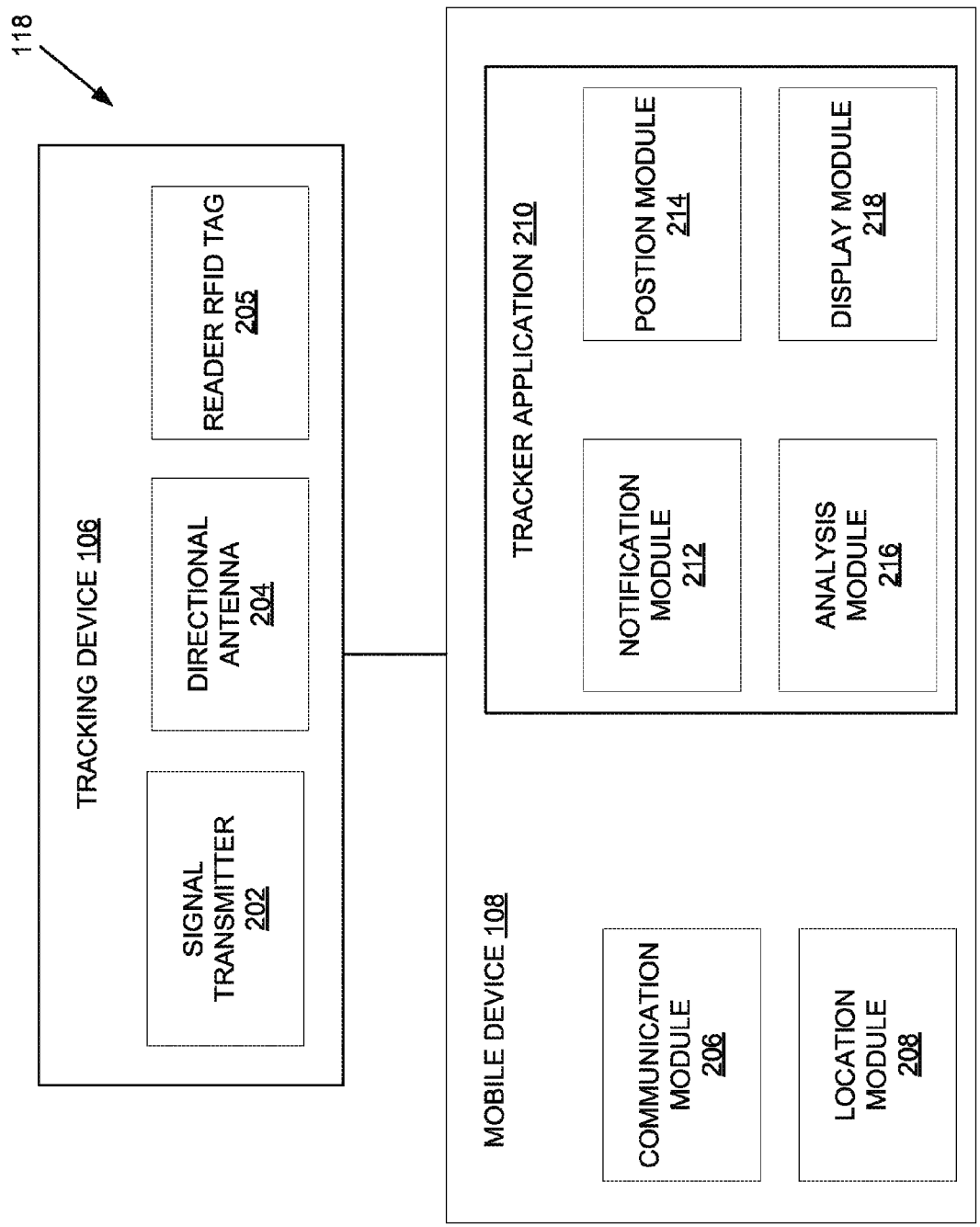
FIG. 2 is a block diagram illustrating an example embodiment of a RFID reader.

Referring now to FIG. 2, a block diagram illustrating an example embodiment of components within the reader 118 is shown. In some embodiments, the tracking device 106 is coupled to the mobile device 108 as a peripheral device (e.g., a mobile device jacket). In other embodiments, the tracking device 106 may be embodied within the mobile device 108 (e.g., components and functionality combined within a single device).

In example embodiments, the tracking device 106 comprises a signal transmitter 202, a directional antenna 204, and a reader RFID tag 205. In embodiments where the trackable device 104 is semi-passive, the signal transmitter 202 sends a signal to the trackable device 104 to activate the trackable device 104. For example, the trackable device 104 is passive, but once the child 102 wanders off, the first user 110 may cause the tracking device 106 to send a codeword or signal to activate the trackable device 104. Once activated, the trackable device 104 emits a RFID signal which may be detected by the directional antenna 204. Accordingly, the directional antenna 204 may detect a direction of the RFID signal emitted by the trackable device 104. However, the tracking device 108 does not know how far the trackable device 104 is from the tracking device 106.

The reader RFID tag 205 uniquely identifies the reader 118. In some embodiments, the reader RFID tag 205 may be recorded at the central server 116. An identifier of the reader RFID tag 205 may be exchanged with one or more other readers, such that the other readers can detect the reader 118. For example, during a registration process where the readers may be paired in order to cooperate (e.g., set up a family plan), the reader RFID tag 205 may be exchanged. In other embodiments, the identifier of the reader RFID tag 205 may be provided to other readers during a search process.

The mobile device 108 may comprise a communication module 206, a location module 208, and a tracker application 210. The communication module 206 exchanges communications and data with other devices. In example embodiments, the communication module 206 provides the data to the central server 116, and the central server 116 relays the data to other cooperating devices (e.g., other mobile devices that are linked or associated with the mobile device 108). In other embodiments, the communication module 206 may exchange data with other mobile devices without sending the data through the central server 116.

The location module 208 may determine an actual location of the mobile device 108. In one embodiment, the location module 208 may comprise a GPS unit. Accordingly, if the mobile device 108 is located near a window or door, for example, the actual location of the mobile device 108 may be determined.

The tracker application 210 may be embodied on or otherwise stored in a storage device (e.g., memory) of the mobile device 108. The tracker application 210 may be downloaded or otherwise provided to the mobile device 108 by, for example, the central server 116. In example embodiments, the tracker application 210 manages exchange and analysis of tracking data in order to determine a location of the child 102. Accordingly, the tracker application 210 comprises a notification module 212, a position module 214, an analysis module 216, and a display module 218.

In example embodiments, the notification module 212 manages notifications sent or received by the mobile device 108. For instance, if the first user 110 of the mobile device 108 activates the tracker application 210 in order to find their child 102, the notification module 212 may generate and send (e.g., via the communication module 206) a notification to other linked mobile devices (e.g., mobile device 108 of the second user 112). The notification may be sent via the central server 116 or be sent direction to the linked mobile devices. Alternatively, the notification module 212 may receive a notification that a paired reader has activated their tracker application, which may trigger the tracker application 210 on the mobile device 108 to activate. In other instances, the notification module 212 may receive a notification from the central server 116 indicating that another user that is not linked to the first user 110 of the mobile device 108 (e.g., no association in a record of the first user 110) is attempting to find their child and inquiring whether the first user 110 is willing to assist in the search effort. The first user 110 may respond to the request and cooperate in the search for the other user's child.

The position module 214 manages determination of positions of the child 102, the first reader 118, and the other readers relative to the first reader 118. In example embodiments, the first reader 118 may determine the reader RFID tag of a paired reader (e.g., second reader 120) and detect a position of the paired reader relative to the first reader 118. In some cases, the paired reader may be located near a window, door, or other access point which allows the paired reader to ascertain its actual position using GPS. The position module 214 of the first reader 118 may use the actual location of the paired reader to determine its own relative position. In some cases, the paired reader may provide its actual location to the first tracker device 116 (e.g., via the central server 116). The position module 214 may also determine positional data (e.g. vector indicating a particular direction) of the child 102 based on the signal detected by the directional antenna 204 from the trackable device 104.

The analysis module 216 manages the determination of a relative location of the child 102 based on an analysis of positional data determined from the RFID signal and the position of the various readers. The analysis performed by the analysis module 216 will be discussed in more detail in connection with FIG. 3 and FIG. 4 below.

Once the relative position of the child 102 is determined, the display module 218 presents the relative position to the user of the mobile device 108. For example, the display module 218 may indicate the relative position of the child 102 using a compass or other directional graphic to indicate the direction of the child and provide a relative distance to the child 102. In embodiments where a map of the environment is available, the relative position of the child 102 may be shown on the map.

Figure 3:
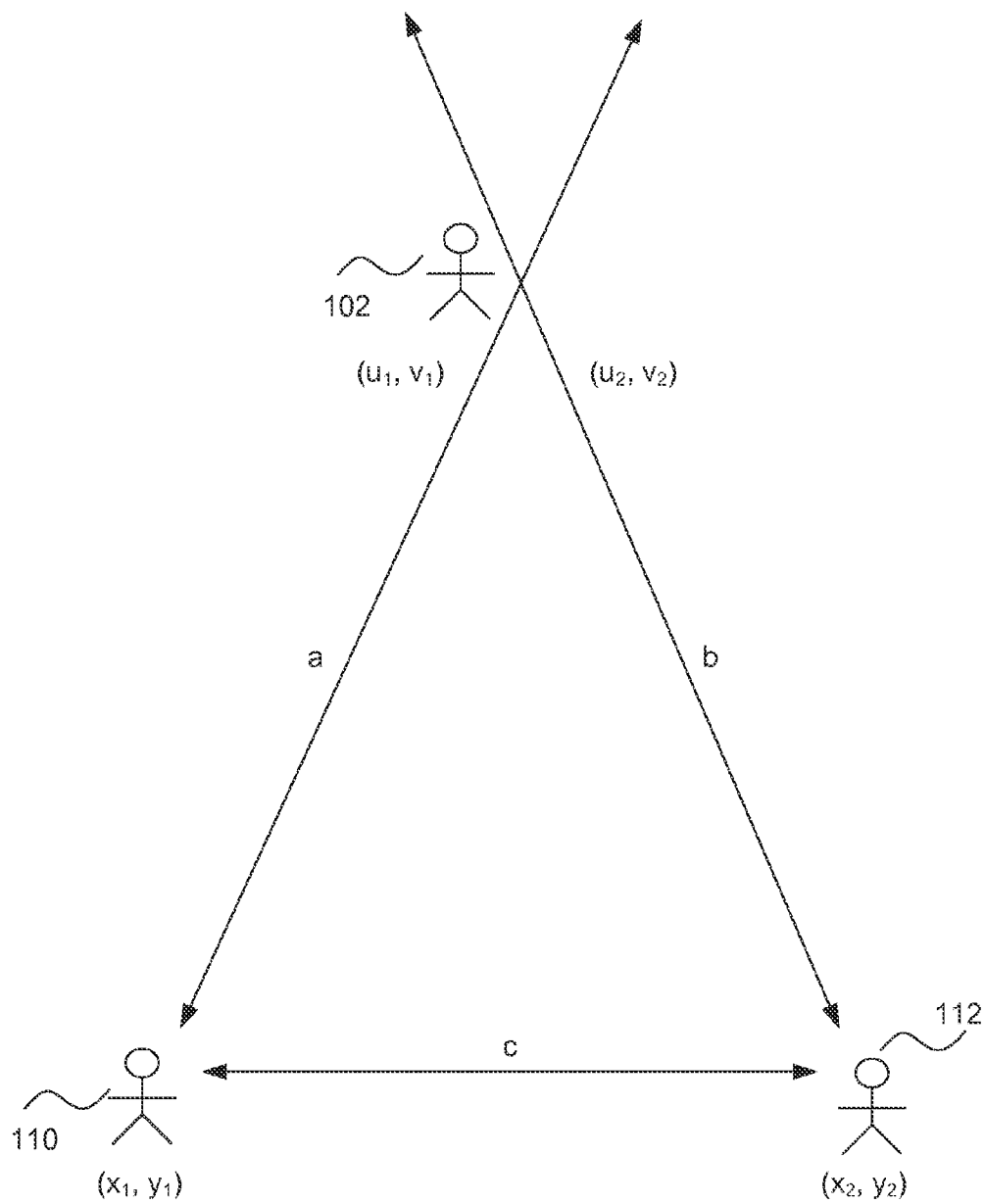
FIG. 3 is a diagram illustrating an example layout for determining a location of a child.

FIG. 3 is a diagram illustrating an example layout for triangulating a location of the child 102. In example embodiments, the child 102 is tagged with a passive or active trackable device having a RFID tag. Using the first reader 118 (e.g., having the tracking device 106, such as, a handheld directional RFID reader), the first user 110 scans an area in a sweeping motion to attempt to detect the RFID signal from the trackable device 104. The second user 112 also scans the area to attempt to detect the RFID signal from the trackable device 104 on the child 102. In various embodiments, any number of readers may be used cooperatively and communicate with each other in order to locate the child 102. The first reader 118 of the first user 110 detects the RFID signal, which gives the first user 110 a starting position (e.g., where the first user 110 is standing) and a direction in which the RFID signal is coming from.

Additionally, the second user 112 also detects the RFID signal using his reader 120. Because the two users are paired with each other (e.g., linked to each other in an account, registered together, or agreed to cooperate), the two readers of the first user 110 and the second user 112 may share data. Specifically, the first reader 118 of the first user 110 may provide position data (e.g., a location), positional (directional) data of the RFID signal (e.g., a compass bearing of a directional plane of reception), and strength of the reception of the RFID signal (also referred to as a "hit strength"). With the shared data from the one or more paired or linked readers, each reader can calculate and display, for example, reception planes/compass bearings, an intersection of the reception planes, and hit strength to identify the position of the child 102.

The following line equations use Euclidean math to determine the intersection point, and thus, the relative location of the child 102. The line question of the first user 110 may be $$l_1 = \begin{pmatrix} x_1 \\ y_1 \end{pmatrix} + a \begin{pmatrix} u_1 \\ v_1 \end{pmatrix}$$

where $$\begin{pmatrix} x_1 \\ y_1 \end{pmatrix}$$

represents coordinates of the first user 110, a is an unknown distance to the child 102, and $$\begin{pmatrix} u_1 \\ v_1 \end{pmatrix}$$

represents coordinates of a direction of a vector to the child 102 relative to the first user 110.

Similarly, the line equation for the second user 112 may be $$l_2 = \begin{pmatrix} x_2 \\ y_2 \end{pmatrix} + b \begin{pmatrix} u_2 \\ v_2 \end{pmatrix}$$

where $$\begin{pmatrix} x_2 \\ y_2 \end{pmatrix}$$

represents coordinates of the second user 112, b is an unknown distance to the child 102, and $$\begin{pmatrix} u_2 \\ v_2 \end{pmatrix}$$

represents coordinates of a direction of a vector to the child 102 relative to the second user 112.

Therefore, the intersection may be calculated as follows.

$$\begin{pmatrix} x_1 \\ y_1 \end{pmatrix} + a \begin{pmatrix} u_1 \\ v_1 \end{pmatrix} = \begin{pmatrix} x_2 \\ y_2 \end{pmatrix} + b \begin{pmatrix} u_2 \\ v_2 \end{pmatrix}$$

In example embodiments, each reader attempts to locate a position of the RFID tag associated with the child 102 so that it may inform their respective user of the position of the child 102 relative to the user's position. Additionally, the position of the other reader(s) may also be relative to the position of each reader. As such, each reader may consider its own position as an origin, and calculate the position of the other reader(s) purely relative to it.

A majority of places where a child may be missing are indoors (e.g., entertainment centers, malls. In such locations, GPS rarely works. Accordingly, the analysis module 216 may use a position of the origin for the reader to calculate the intersection of the reader's detection plane. As such, a relative position of the child 102 may be calculated based on the intersection of a number of detection planes, whereby the position of one reader is defined using a relative position of the other reader. As a reminder, the line equation for the first reader 118 of the first user 110 may be $$l_1 = \begin{pmatrix} x_1 \\ y_1 \end{pmatrix} + a \begin{pmatrix} u_1 \\ v_1 \end{pmatrix},$$

while the line equation for the second reader 120 of the second user 112 may be $$l_2 = \begin{pmatrix} x_2 \\ y_2 \end{pmatrix} + b \begin{pmatrix} u_2 \\ v_2 \end{pmatrix}.$$

If $$\begin{pmatrix} x_2 \\ y_2 \end{pmatrix}$$

is defined as a position relative to $$\begin{pmatrix} x_1 \\ y_1 \end{pmatrix},$$

then $l_2$ may be defined as follows $$l_2 = \begin{pmatrix} x_1 \\ y_1 \end{pmatrix} + c \begin{pmatrix} u_3 \\ v_3 \end{pmatrix} + b \begin{pmatrix} u_2 \\ v_2 \end{pmatrix}$$

where $$\begin{pmatrix} u_3 \\ v_3 \end{pmatrix}$$

represents coordinates of a direction of a known vector between the first user 110 and the second user 112 and c is a distance between them. In some embodiments, the known vector and the distance c may be determined using the directional antenna 204 of the reader to detect a signal (e.g., RFID signal corresponding to the reader RFID tag 205) from the other reader or from data exchanged via the central server 116. As such, relative positioning information is determined based on each reader having a passive RFID tag (e.g., reader RFID tag 205) built into it. When detecting positions of the readers, information about the position of readers that are too far away to be detected using RFID may be passed down in a daisy chain of communicating readers, thereby allowing the use of data from far away readers even when they are out of range of the directional antenna.

Each reader knows a direction of the child 102 (e.g., a vector to the child 102) but not how far the child 102 is in the direction. The above equations allow one reader to take the position of the other reader, which it knows relative to itself, and determine the exact distance, c. Then, the reader of the first user 110 may calculate the value a (e.g., a distance from the first user 110 to the child 102). Similarly, the reader of the second user 112 may calculate the value b (e.g., a distance from the second user 112 to the child 102). As a result, the intersection, using the relative positioning of the first reader 118 of the first user 110 may be $$\begin{pmatrix} x_1 \\ y_1 \end{pmatrix} + a \begin{pmatrix} u_1 \\ v_1 \end{pmatrix} = \begin{pmatrix} x_1 \\ y_1 \end{pmatrix} + c \begin{pmatrix} u_3 \\ v_3 \end{pmatrix} + b \begin{pmatrix} u_2 \\ v_2 \end{pmatrix}.$$

As a result, each reader has a location of the trackable device 104 of the child 102. Combining this information gives a number of data points for the child's location. The data points may then be displayed on the mobile device 108. Alternatively, the data points may be averaged and a single, averaged data point displayed on the mobile device 108. Further still, one or more data points may be displayed with an inferred percentage of accuracy and certainty. It is noted that while two-dimensional vectors are shown, example embodiments may be adapted to utilize three-dimensional vectors.

Figure 4:
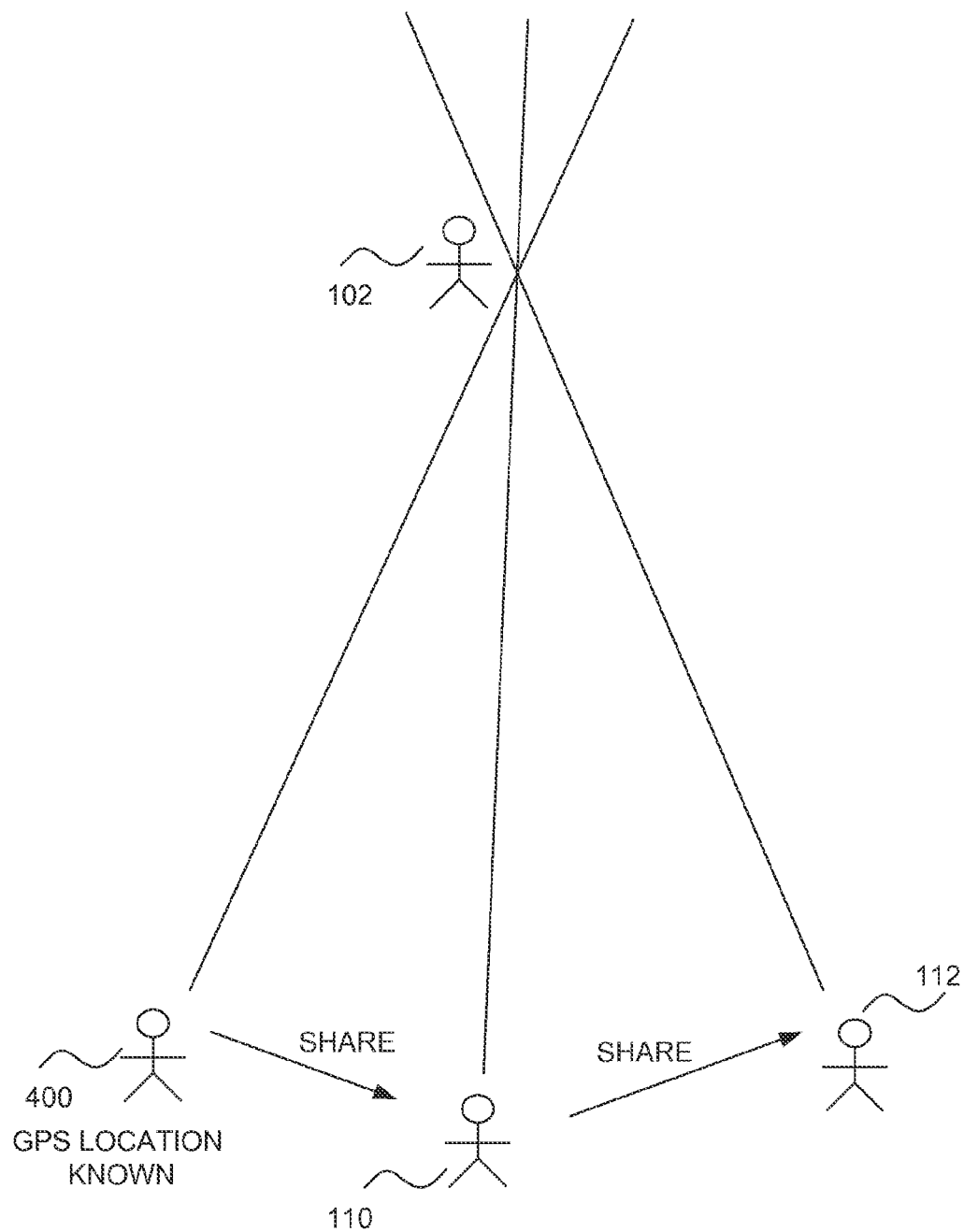
FIG. 4 is a diagram illustrating another example layout for determining a location of a child.

FIG. 4 is a diagram illustrating another example layout for determining a location of the child 102. In this example, three users each having a reader (e.g., a combination of the tracking device 106 and the mobile device 108) are cooperating to determine the location of the child 102. Location clarity may be achieved when one of the readers is able to obtain a GPS lock. For example, a third user 400 may be located in an area that can obtain a GPS lock (e.g., the third user 400 may be near a window or door). As such, the reader of the third user 400 knows its GPS location. The GPS location, which is an actual position of the reader of the third user 400, may be shared with the first reader 118 of the first user 110, which is within a close enough distance to directly detect the position of the reader of the third user 400. Accordingly, the first reader 118 of the first user 110 may calculate its relative position based on the actual position of the reader of the third user 400.

Similarly, the second user 112 can infer his relative location from the actual or relative positions of other readers. For example, the second reader 120 of the second user 112 may calculate its relative position based on the relative position of the first reader 118 of the first user 110 (e.g., after the first reader 118 of the first user has determined its relative position based on the actual position of the reader of the third user 400). For example, the second reader 120 of the second user 112 may use the basic law of transitvity by using relative position data of the first reader 118 of the first user 110 to calculate its own position relative to the reader of the third user 400. As such, the actual position (e.g., GPS location) of the reader of the third user 400 may be daisy-chained down to all of the other readers.

However, if the second reader 120 of the second user 112 is within range (e.g., to detect a signal or otherwise exchange data) of the reader of the third user 400, then the position data of the first reader 118 of the first user 110 is not needed. Instead, the second reader 120 of the second user 112 may calculate its relative position based on the actual location of the reader of the third user 400.

Figure 5:
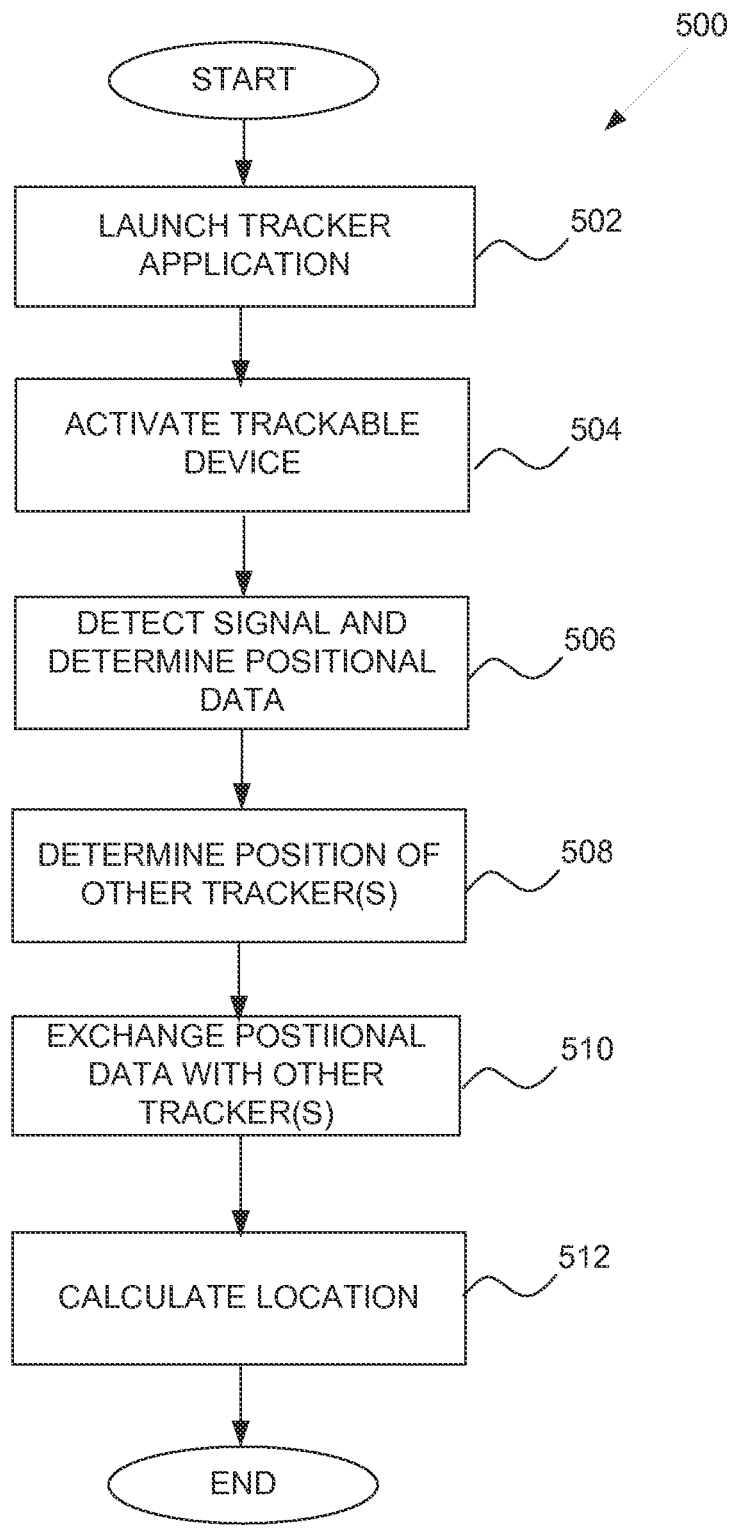
FIG. 5 is a flow diagram of an example method for tracking a child using RFID.

FIG. 5 is a flow diagram of an example method 500 for tracking a child using RFID. The method 500 assumes that there are at least two linked readers (e.g., reader of a first parent and reader of a second parent). The readers may be linked, for example, when the two users share an account (e.g., a family data plan on a cellular network) or are otherwise permissively linked within the central server 116 (e.g., the first user 110 listed the second user 112 in their account). The method 500 is discussed as being performed by the first reader 118 of the first user 110.

In operation 502, the tracker application 210 on the first reader 118 is launched. In example embodiments, an indication may be sent to the central server 116 that the tracker application 210 has been launched. In some embodiments, the central server 116 may determine an identifier of the trackable device 104 that is associated with the account of the first user. In other embodiments, the identifier of the trackable device 104 may be locally stored at the reader (e.g., the mobile device 108) of the first user.

In operation 504, the first reader 118 of the first user 110 activates the trackable device 104 on the child. In one embodiment, the signal transmitter 202 of first reader 118 sends out a control word. The control word comprises the identifier of the trackable device 104, which triggers the trackable device 104 to respond.

In operation 506, a signal from the trackable device 104 is detected. The signal may indicate a general direction that the trackable device 104 is located relative to the first reader 118. For example, the directional antenna 204 (e.g., within the tracking device 106) of the first reader 118 detects the signal. Accordingly, the position module 214 may determine positional data (e.g., a direction of a vector to the trackable device 104 of the child 102) based on the signal. While the direction is determined, a distance to the trackable device 204 is not known.

In operation 508, the first reader 118 of the first user 110 determines position data relative to other readers. In one embodiment, the first reader 118 of the first user 110 performs a broadcast with an identifier of the second reader 120 of the second user 112 to detect a position of the second reader 120 of the second user 112, and vice-versa. Each reader may then determine its position relative to the other readers (and relative to the child 102). For example, the first reader 118 of the first user 110 may, using the position module 214, determine its position relative to the second reader 120 of the second user 112. Calculations of the position data was discussed in connection with FIG. 3 and FIG. 4 above.

The positional data is exchanged in operation 510. In example embodiments, the positional data is exchanged via the central server 116. For example, positional data from the first user 110 may be sent to the central server 116, which then relays the positional data to the second user, and vice-versa. Alternatively, other communication methods may be used such as, Bluetooth, radio frequency, or peer-to-peer communication. In one embodiment, these alternative communication methods may be used as a backup if cellular or WiFi service is not available. As a result, each reader knows its position relative to the other reader and the child 102. The flow of information (e.g., positional data) may be constant if any one or more of the first user 110, second user 112, or child 102 is moving. Accordingly, the positional data may be constantly updated and displayed on the reader (e.g., the mobile device 108).

Using the shared data, the analysis module 216 may calculate (e.g., triangulate) a relative position of the trackable device 104 on the child 102. The relative position may indicate both a direction and distance to the trackable device 104. Alternatively, since the central server 116 may receive all the data from the linked readers, the central server 116 may calculate the location of the trackable device 104 and provide the calculated location to the readers. When the child 102 is found, the user may provide an indication to the central server 116 that the child 102 is found. For example, the notification module 212 may send a notice indicating the child 102 was found. Alternatively, the central server 116 may assume the child 102 was found based on the tracker application being turned off (e.g., signaling that tracking is no longer needed).

Figure 6:
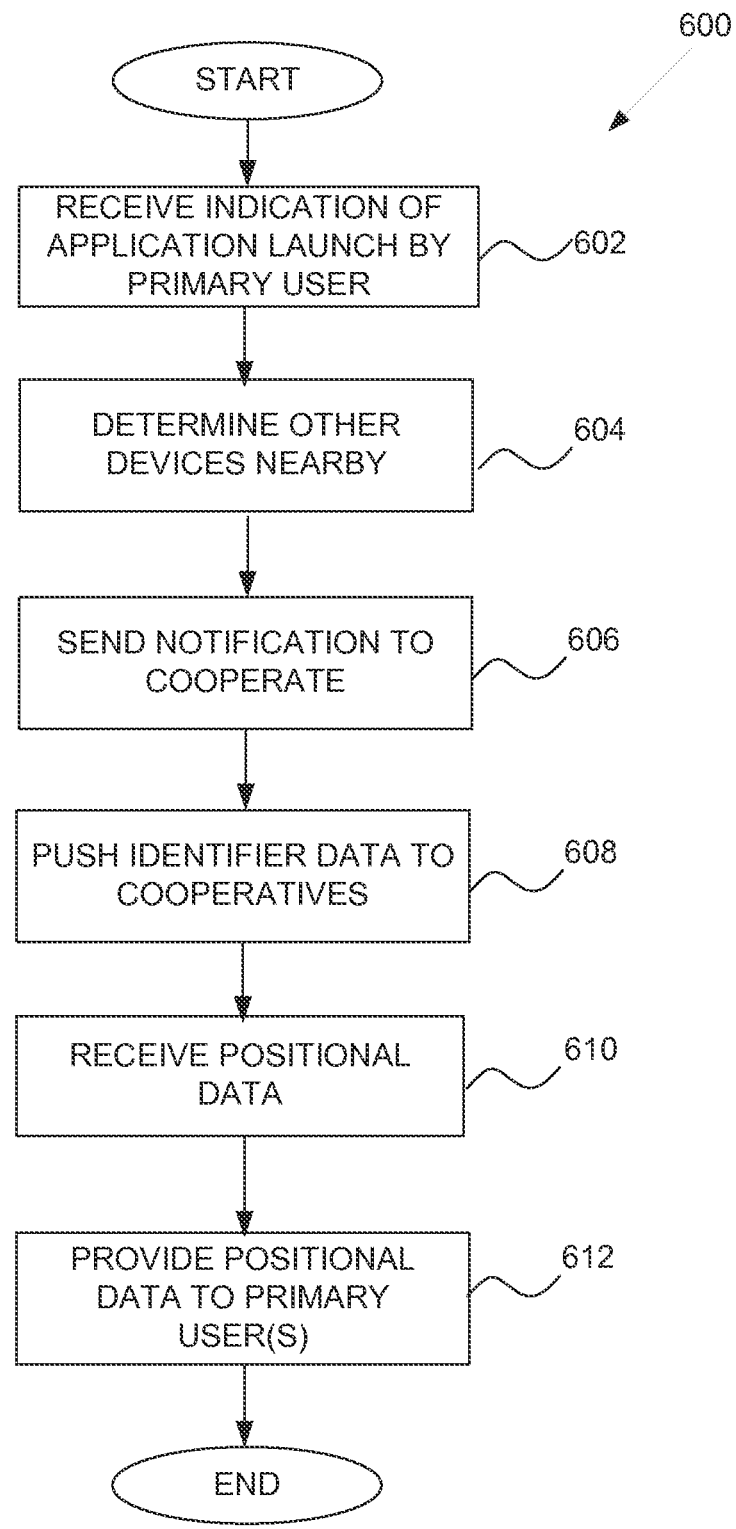
FIG. 6 is a flow diagram of an example method for coordinating tracking of a child involving cooperatives.

FIG. 6 is a flow diagram of an example method 600 for coordinating tracking of a child involving cooperatives. A cooperative is a reader and its user that is not linked to an account of an individual searching for a child (e.g., parent). For example, the cooperative may be a stranger that happens to be in an area that the individual is searching. The cooperative may volunteer in an effort to find the child. The method 600 may be performed by the central server 116.

In operation 602, a communication module of the central server 116 receives an indication that a tracker application is launched by one or more primary user(s) (e.g., parent(s) of a lost child, such as, the first user 110 and the second user 112). For example, the tracker application may automatically notify the central server 116 that the tracker application is launched and that the primary user(s) are starting to search for their child. One of the primary users may also send, with the indication of the tracker application launch, a request for other users to assist in searching for the child.

In operation 604, the central server 116 determines other readers that may be nearby. In one embodiment, the central server 116 determines a last know location of the reader of the primary user (e.g., the primary user that sent the request). The central server 116 than determines, from a search of its database, other users who are near the last known location of the primary user. These other users are determined to have readers that have a copy of the tracker application and are capable of detecting the RFID signal of the child and determining corresponding positional data.

The central server 116 sends a notification to the other users who are near the last known location of the primary user in operation 606. The notification asks each of the other users if they would like to cooperate in searching for the child. If one or more of the other users responds affirmatively, the tracker application on the reader of each of these other users launches. Each of these other users is now a "cooperative" in searching for the child.

In operation 608, identifier data is pushed to the cooperative. Accordingly, the central server 116 may push an identifier of the trackable device (e.g., RFID tag) on the child to the cooperative. Additionally, the central server 116 may push identifiers of all other cooperatives and the primary user(s). In example embodiments, the identifiers of the other cooperatives and the primary users are the reader RFID tags of their respective reader.

In operation 610, positional data is received from readers of one or more of the primary users and the cooperatives that have detected the RFID signal from the trackable device. The positional data may then be shared with the primary users, and the readers of the primary users may attempt to calculate a location of the child. In contrast, the tracker applications on the readers of the cooperatives are prevented from receiving the positional data from other readers and do not display any positional data. Instead, the readers of the cooperatives may just indicate that the child is found and the search is over based on the primary user indicating that the child is found.

Figure 7:
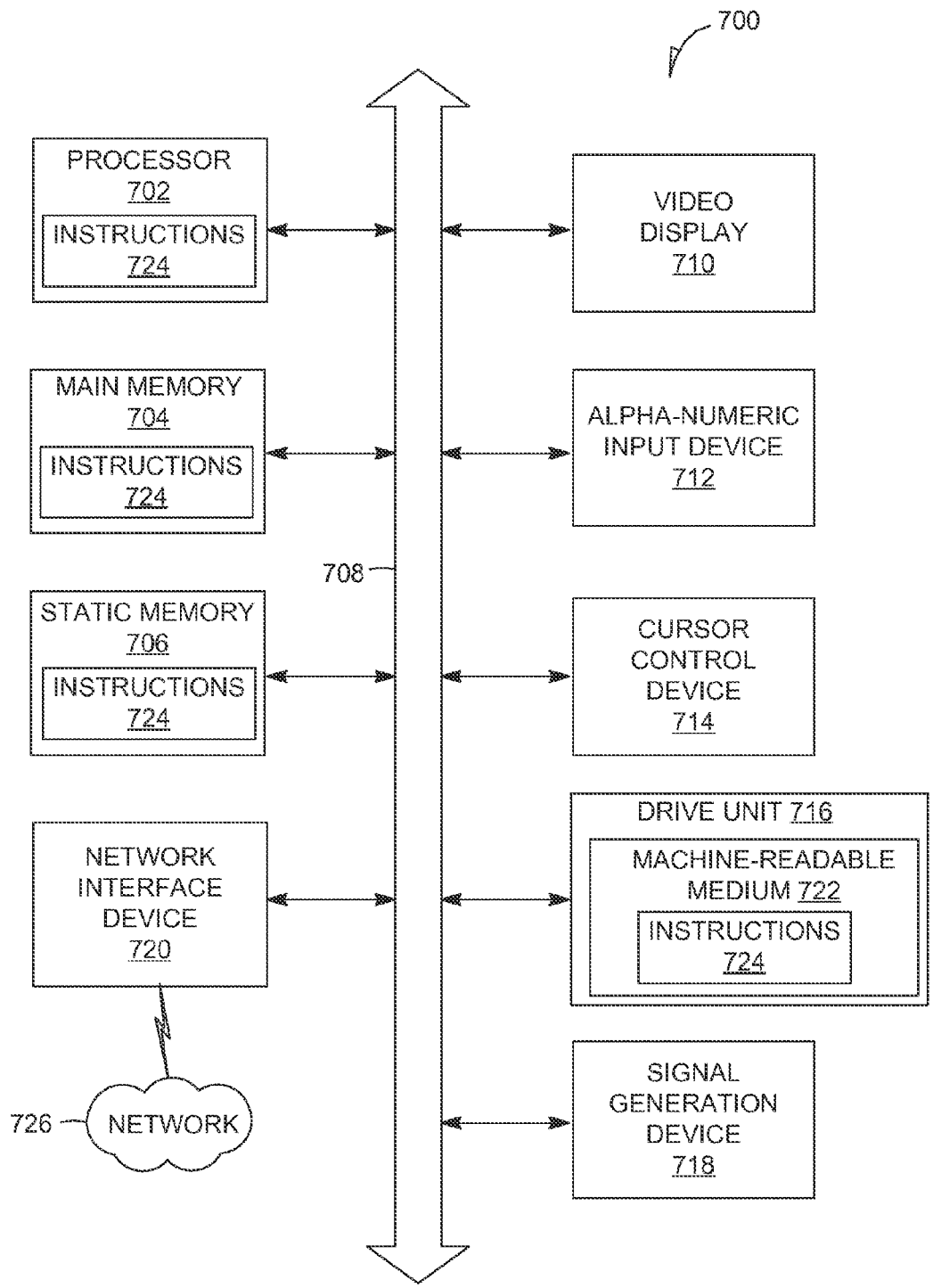
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a non-transitory machine-readable medium, a machine-readable storage medium, a computer-readable storage medium, or any suitable combination thereof) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard or keypad), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible and/or non-transitory machine-readable storage medium) on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media (e.g., tangible and/or non-transitory machine-readable media). The instructions 724 may be transmitted or received over a network 726 via the network interface device 720. For example, the network interface device 720 may communicate the instructions 724 using any one or more transfer protocols (e.g., hypertext transfer protocol (HTTP)).

In some example embodiments, the machine 700 may be a portable computing device, such as a smart phone or tablet computer, and have one or more additional input components (e.g., sensors or gauges). Examples of such additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a tangible machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium"

shall also be taken to include any medium, or combination of multiple media, that is capable of storing instructions for execution by a machine (e.g., machine 700), such that the instructions, when executed by one or more processors of the machine (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A machine-readable medium having no transitory signals and storing instructions which, when executed by at least one processor of a machine, cause the machine to perform operations comprising:

transmitting an indication, to a central server, that a tracker application is launched on a first reader, the indication causing the central server to determine other readers in an area corresponding to a last known location of the first reader and to send a notification to the other readers that asks users of the other readers whether the users will cooperate;

detecting, at the first reader, a signal from a trackable device;

determining first positional data of the trackable device from the signal, the first positional data indicating a first direction of the trackable device relative to the first reader without indicating a distance;

receiving second positional data from a second reader, the second positional data indicating a second direction of the trackable device relative to the second reader without indicating a distance;

calculating a location of the trackable device using the first positional data and the second positional data; and presenting the location on the first reader.

2. The machine-readable medium of claim 1, wherein the operations further comprise sending, by the first reader, a codeword to activate the trackable device, the code word including an identifier of the trackable device.

3. The machine-readable medium of claim 1, wherein the operations further comprise determining positional data of the second reader relative to the first reader.

4. The machine-readable medium of claim 3, wherein the determining the positional data of the second reader relative to the first reader comprises:

detecting a reader signal from the second reader;

determining a vector between the first reader and the second reader rising the reader signal; and determining a relative distance between the first reader and the second reader.

5. The machine-readable medium of claim 1, wherein the operations further comprising sharing the first positional data for the first reader with the second reader.

6. The machine-readable medium of claim 1, wherein the indication causes the central server to:

access an account of a user of the first reader; and identify the second reader linked to the first reader in the account.

7. The machine-readable medium of claim 1, wherein the other readers includes the second reader.

8. The machine-readable medium of claim 1, wherein the obtaining the directional signal from the trackable device comprises scanning an area using a directional antenna of the first reader.

9. The machine-readable medium of claim 1, wherein the signal from the trackable device is an RFID signal.

10. The machine-readable medium of claim 1, wherein the presenting the location on the reader comprises:

accessing a map of an area that the reader is located;

displaying the map on the first reader; and indicating the location of the trackable device on the map.

11. A method comprising:

receiving an indication of a tracker application launch on a first reader, the indication including a request for cooperative assistance;

determining, using a hardware processor, at least one other reader near a last known location of the first reader;

sending a notification to the at least one other reader asking for the cooperative assistance;

receiving positional data from a cooperative reader, the cooperative reader being one of the at least one other reader that responded affirmatively to the notification, the positional data indicating a direction of a trackable device relative to the cooperative reader without indicating a distance; and providing the positional data from the cooperative reader to the first reader, the first reader using the positional data from the cooperative reader and positional data from the first reader to calculate a location of the trackable device, the positional data from the first reader being based on a signal from the trackable device detected by the first reader and indicating a direction of the trackable device relative to the first reader without indicating a distance.

12. The method of claim 11, further comprising:

receiving an affirmative response from the cooperative reader to the notification; and providing identifier data to the cooperative reader, the identifier data including an identifier of the trackable device and an identifier of the first reader.

13. The method of claim 11, further comprising:

receiving an indication that the trackable device is found; and providing a message to the cooperative reader that the trackable device is found.

14. The method of claim 11, further comprising preventing sharing of the positional data from others readers with the cooperative reader.

15. A system comprising:

a directional antenna to detect, at a first reader, a signal from a trackable device;

one or more hardware processors temporarily configured to:

transmit an indication, to a central server, that a tracker application is launched on the first reader, the indication causing the central server to determine other readers in an area corresponding to a last known location of the first reader and send a notification to the other readers that asks users of the other readers whether the users will cooperate;

determine first positional data of the trackable device from the signal, the first positional data indicating a first direction of the trackable device relative to the first reader without indicating a distance;

receive second positional data from a second reader, the second positional data indicating a second direction of the trackable device relative to the second reader without indicating a distance;

calculate a location of the trackable device using the first positional data and the second positional data; and present the location on the first reader.

16. The system of claim 15, wherein the one or more hardware processors are further configured to send and receive communications directed to cooperating in a search for a child associated with a further reader that is not linked with the first reader.

17. The system of claim 15, further comprising a signal transmitter to send a codeword to activate the trackable device, the code word including an identifier of the trackable device.

18. The system of claim 15, further comprising a reader RFID tag to transmit a reader signal to a further reader, the reader signal used to determine a position of the first reader relative to the further reader.

19. The system of claim 15, wherein the directional antenna is embodied with a peripheral device coupled to a mobile device.

* * * * *